(12) United States Patent
DiGiovanni et al.

(10) Patent No.: US 7,916,386 B2
(45) Date of Patent: Mar. 29, 2011

(54) HIGH POWER OPTICAL APPARATUS EMPLOYING LARGE-MODE-AREA, MULTIMODE, GAIN-PRODUCING OPTICAL FIBERS

(75) Inventors: David John DiGiovanni, Mountain Lakes, NJ (US); Clifford Everill Headley, Raritan Township, NJ (US)

(73) Assignee: OFS Fitel, LLC, Norcross, GA (US)

( * ) Notice: Subject to any disclaimer, the term of this patent is extended or adjusted under 35 U.S.C. 154(b) by 918 days.

(21) Appl. No.: 11/698,541

(22) Filed: Jan. 26, 2007

(65) Prior Publication Data
US 2008/0180787 A1    Jul. 31, 2008

(51) Int. Cl.
*H04B 10/17* (2006.01)
*H01S 3/00* (2006.01)

(52) U.S. Cl. ............... 359/341.33; 359/334; 359/341.32

(58) Field of Classification Search ................. 359/334, 359/341.32, 341.33
See application file for complete search history.

(56) References Cited

U.S. PATENT DOCUMENTS

| | | | |
|---|---|---|---|
| 5,859,942 A * | 1/1999 | Ueda | 385/49 |
| 5,864,644 A | 1/1999 | DiGiovanni et al. | 385/43 |
| 6,731,837 B2 * | 5/2004 | Goldberg et al. | 385/27 |
| 7,013,678 B2 | 3/2006 | DiGiovanni et al. | 64/435 |
| 2002/0063952 A1 * | 5/2002 | Nyman et al. | 359/342 |
| 2002/0159694 A1 * | 10/2002 | Yano | 385/33 |
| 2003/0156605 A1 * | 8/2003 | Richardson et al. | 372/25 |
| 2004/0247272 A1 * | 12/2004 | Dawson et al. | 385/127 |
| 2005/0008044 A1 | 1/2005 | Fermann et al. | |
| 2005/0163426 A1 * | 7/2005 | Fermann et al. | 385/37 |
| 2006/0103919 A1 | 5/2006 | Digiovanni et al. | |

(Continued)

FOREIGN PATENT DOCUMENTS

CA    2406423 A1    6/2003

(Continued)

OTHER PUBLICATIONS

B. Desthieux et al., "111 kw (0.5 mJ) pulse amplification . . . ," *Appl. Phys. Lett.*, vol. 63, No. 5, pp. 586-588 (Aug. 1993).

(Continued)

*Primary Examiner* — Eric Bolda
(74) *Attorney, Agent, or Firm* — Michael J. Urbano (57) ABSTRACT

Optical apparatus includes a multimode, gain-producing fiber for providing gain to signal light propagating in the core of the fiber, and a pump source for providing pump light that is absorbed in the core, characterized in that (i) the pump source illustratively comprises a low brightness array of laser diodes and a converter for increasing the brightness of the pump light, (ii) the pump light is coupled directly into the core, and (iii) the area of the core exceeds approximately 350 μm$^2$. In one embodiment, the signal light propagates in a single mode, and the pump light co-propagates in at least the same, single mode, both in a standard input fiber before entering the gain-producing fiber, and a mode expander is disposed between the input fiber and the gain-producing fiber. In another embodiment, multiple pumps are coupled into the core of the gain-producing fiber. The pumps may generate light of the same wavelength or of different wavelengths. In accordance with a particular embodiment of our invention, we have demonstrated amplification of nanosecond optical pulses at 1545 nm in a single clad Er-doped fiber having a core area of 875 μm$^2$; the core was pumped by a high brightness Raman laser at 1480 nm; and the pulses had a record peak power of several hundred kW.

27 Claims, 3 Drawing Sheets

U.S. PATENT DOCUMENTS

2006/0187541 A1* 8/2006 Starodoumov ............ 359/341.32
2006/0263018 A1 11/2006 Takagi et al.

FOREIGN PATENT DOCUMENTS

| EP | 1298765 A1 | 2/2003 |
|---|---|---|
| EP | 1487070 A1 | 12/2004 |
| JP | 2008187176 A * | 8/2008 |
| WO | WO2006027298 A1 | 3/2006 |

OTHER PUBLICATIONS

N. Park et al., "High-Power Er-Yb Doped Fiber Amplifier . . . ," *IEEE Photon. Technol. Lett.*, vol. 8, No. 9, pp. 1148-1150 (Sep. 1996).

D. Taverner et al., "158-µJ pulses from a single-transverse-mode . . . ," *Opt. Lett.*, vol. 22, No. 6, pp. 378-380 (Mar. 1997).

H. I. Offerhaus et al., "High-energy single-transverse-mode Q-switched . . . ," *Opt. Lett.*, vol. 23, No. 21, pp. 1683-1685 (Nov. 1998).

A. Galvanauskas, "Mode-Scalable Fiber-Based Chirped Pulse . . . ," *IEEE J. Selected Topics in Quant. Electr.*, vol. 7, No. 4, pp. 504-517 (Jul./Aug. 2001).

M. Savage-Leuchs et al., "High pulse energy extraction . . . ," *Proc. SPIE*, vol. 6102, 610207-(1-8) (2006).

J. M. Fini, "Bend-resistant design of conventional and microstructure fibers . . . ," *Opt. Express*, vol. 14, No. 1, pp. 69-81 (Jan. 2006).

D. J. DiGiovanni et al., "Progress in All-Fiber Components," *Proc. SPIE*, vol. 6102, pp. 1-5, Fiber Lasers III: Technology, Systems, and Applications, A. J. W. Brown et al., Ed., 6102L (Feb. 2006).

"Encyclopedia of Laser Physics and Technology," pp. 1-2, found on an internet website at URL http://www.rp-photonics.com/brightness.html on Jan. 24, 2007.

M Borecki et al: "Multimode amplifiers with fibers doped Nd or Er working point analysis" Proceedings of the SPIE, vol. 4239, 2000, pp. 176-181, SP002474476—the whole document.

Pedersen B et al: "Detailed Design Analysis of Erbium-Doped Fiber Amplifiers" IEEE Photonics Technology Letters, IEEE Service Center, Piscataway, NJ, US, vol. 3, No. 6, Jun. 1, 1991, pp. 548-550, XP000227345 ISSN: 1041-1135—the whole document.

Karpov V I et al: "Laser-diode-pumped phosphosilicate-fiber Raman laser with an output power of 1 W at 1.48 mu m" Optics Letters, OSA, Optical Society of America, Washington, DC, US, vol. 24, No. 13, Jul. 1, 1999, pp. 887-889, XP002185374 ISSN: 0146-9592—p. 887, col. 2, paragraph 2—p. 888, col. 1, paragraph 2.

J. Chirravuri et al: "Multiwavelength pumping of Erbium-Doped Fiber Amplifiers in the 980 nm Band" Proceedings of the SPIE Fiber Laser Sources and Amplifiers IV, vol. 1789, 1992, pp. 214-219, XP002491578—the whole document.

Taverner D et al: "158-MUJ Pulses From a Single-Transverse-Mode, Large-Mode-Area Erbium" Optics Letters, OSA, Optical Society of America, Washington, DC, US, vol. 22, No. 6, Mar. 15, 1997, pp. 378-380 SP000690331 ISSN:0146-9592.

Gapontsev V P. et al: "25 KW Peak Power, Wide-Tunable-Repetition-Rate and Pulse Duration Eye-Safe Mopfa Laser" Cleo '96. Conference on Lasers and Electro-Optics. Anaheim, Jun. 2-7, 1996; [Conference on Lasers and Electro-Optics. (CLEO)], New York, IEEE, US, Jan. 1, 1996, p. 209/210, XP001150069 ISBN: 978-0/7803-3183-9.

\* cited by examiner

HIGH POWER OPTICAL APPARATUS EMPLOYING LARGE-MODE-AREA, MULTIMODE, GAIN-PRODUCING OPTICAL FIBERS

BACKGROUND OF THE INVENTION

1. Field of the Invention

This invention relates to high power optical apparatus employing large-mode-area (LMA), multimode, gain-producing optical fibers, and, more particularly, to high power optical amplifiers and lasers using such fibers.

2. Discussion of the Related Art

In order to amplify an optical signal propagating in the core of an optical fiber, typically the core is doped with a gain-producing species and then pumped by an optical pump at a wavelength that is absorbed by the species. In silica optical fibers the core is illustratively doped with a rare-earth element (e.g., Er, Yb, Er—Yb, Nd, Tm, Ho, etc) or chromium (Cr), which enables signals at wavelengths in the near infrared range (e.g., ~1000-1600 nm) to be amplified. Er and Er—Yb silica fibers are commonly used to amplify signals at wavelengths above about 1500 nm and are typically pumped at or near either 980 nm or 1480 nm.

Applications of gain-producing fibers (GPFs) range from relatively low power applications such as telecommunications to much higher power applications such as materials processing, spectroscopy, and range finding. We direct our attention here to the latter.

Laser and amplifier systems based on GPFs are compact and rugged sources of high power radiation (e.g., >10 s of kW of peak power). For safety reasons it is desirable to operate such systems at eye-safe wavelengths greater than 1500 nm. Amplifiers employing well-known double clad fibers (DCFs) co-doped with Er—Yb are typically used at these wavelengths. They are pumped by an array of low brightness diode lasers. Because the optical output of the array has a large angular distribution, it can be coupled efficiently only into multimode fibers with large numerical apertures (NAs). To use the diode energy efficiently, the DCF geometry is utilized for GPFs, where the central core (in which the signal propagates) is doped with a gain-producing species and is surrounded by a high NA waveguide. The waveguide includes an undoped, inner cladding that surrounds that core and guides the diode array pump light and a lower refractive index outer cladding that surrounds the inner cladding. This double clad geometry reduces the pump absorption per unit length by a factor approximately proportional to the ratio of the inner cladding area to the core area. Therefore, a relatively high concentration of core dopant is required to achieve high pump absorption over a short fiber length, which is desirable to minimize nonlinear effects, amplified spontaneous emission (ASE), and signal re-absorption.

However, Er concentration in silica is limited by pair-induced quenching. Er—Yb co-doped fibers, where pump energy is absorbed by a high concentration of Yb and transferred to the Er, overcome this limitation and provide high pump absorption and gain per unit length. [See, A. Galvanauskas, "Mode-Scalable Fiber-Based Chirped Pulse Amplification Systems," *IEEE J. Selected Topics in Quant. Electr.*, Vol. 7, No. 4, pp. 504-517 (2001), which is incorporated herein by reference.] This approach has resulted in the generation of pulses with 262 µJ energy (before the onset of nonlinearities) but with a deteriorated beam with $M^2=2.1$. [See, M. Savage-Leuchs, et al., "High pulse energy extraction with high peak power from short-pulse, eye safe all-fiber laser system," *Proc. of SPIE*, Vol. 6102, pp. 610207-(1-8) (2006), which is also incorporated herein by reference.] However Er—Yb co-doped fibers have certain disadvantages. To achieve efficient energy transfer from Yb to Er they are co-doped with large amounts of phosphorus (P), which raises the core index, thereby limiting the maximum achievable mode-field-area (MFA) and making them highly multimoded. The refractive index profile of the core usually has a large center dip due to the burn-off of P during preform manufacture, which distorts the spatial mode. They are pumped at wavelengths between 900 nm and 1000 nm, and therefore the quantum efficiency for gain at 1500 nm is low. Significant heat is, therefore, generated and cooling may be required to prevent damage to the polymer coating that surrounds the inner cladding.

Alternatives to optical amplifiers predicated on the Er—Yb DCF design have been proposed. [See, for example, D. Taverner et al., "158-µJ pulses from a single-transverse-mode, large-mode-area erbium fiber amplifier," *Opt. Lett.*, Vol. 22, No. 6, pp. 378-380 (1997), which is incorporated herein by reference.] In this decade-old paper the authors describe an optical fiber amplifier in which the power stage included a LMA, single mode, Er-doped fiber was end pumped in a backward direction by a Ti-sapphire laser at 980 nm. A 1534 nm signal to be amplified was coupled through a preamplifier stage to the power stage via standard bulk optical components. The coupling optics between the Er-doped fiber and the preamplifier stage were chosen to accommodate their large NA mismatch. This design was reported to have amplified 10-100 pJ signal pulses to an energy of 158 µJ and peak powers of >100 kW. However, the Taverner amplifier design is disadvantageous for several reasons: (i) it uses multiple bulk optical components, which are difficult to align and to keep aligned as environmental conditions change with time; (ii) it uses a Ti-sapphire solid state pump laser, which is large, difficult to control, and has limited power; and (iii) it uses a single mode Er-doped fiber, which means that the MFA is limited and hence the energy storage capacity of the fiber is likewise limited.

Thus, there continues to be a need in the art for high power, GPF apparatus that alleviates one or more of the shortcomings of the prior art designs.

BRIEF SUMMARY OF THE INVENTION

To achieve high pump absorption and gain per unit length, we utilize a multimode GPF that is core-pumped with a high brightness pump source. The core pumping scheme has the advantage that, in a preferred embodiment, the pump light and signal light propagate in essentially the same transverse mode and, therefore, essentially perfectly overlap one another, which reduces ASE. Nearly perfect overlap also minimizes the fiber length needed for a particular gain, which is important to reduce impairments caused by nonlinear effects such as Raman scattering, Brillouin scattering and self-phase modulation.

In order to generate and deliver high power pulses (e.g., >10 s of kW of peak power), preferably our GPF has a relatively high core area, which is advantageous in increasing the energy storage capacity of the fiber (and hence the pulse energy) and in decreasing the effect of nonlinearities, which reduces pulse degradation.

In accordance with one aspect of our invention, optical apparatus includes a multimode, GPF for providing gain to signal light (optical radiation) propagating in the core of the fiber, and a pump source for providing pump light (optical radiation) that is absorbed in the core, characterized in that (i) the pump source illustratively comprises a low brightness array of laser diodes and a converter for increasing the brightness of the pump light, (ii) the pump light is coupled directly into the core, and (iii) the area of the core exceeds approximately 350 μm² and preferably exceeds approximately 800 μm².

In one embodiment, the signal light propagates in a single transverse mode in a standard input fiber before entering the GPF, and the pump light co-propagates in the input fiber in at least the same, single mode. That is, although not preferred, the pump light may be somewhat multimoded. In addition, since the input fiber typically has a core area smaller than that of the GPF, a fiber-based mode expander is disposed between the input fiber and the GPF. In one embodiment, the mode expander comprises a suitably designed, fiber-based GRIN lens, which is essentially wavelength independent over the range of approximately 1000-1600 nm. In a preferred embodiment, the GPF is doped with Er, the signal wavelength is between 1500 and 1600 nm approximately, and the pump wavelength is about 1460-1490 nm.

In another embodiment, multiple pump sources are coupled into the core of a LMA, multimode, GPF. The pump sources may generate light of the same wavelength or of different wavelengths. They may be frequency multiplexed or spatially multiplexed.

In accordance with a particular embodiment of our invention, we have demonstrated amplification of nanosecond optical pulses at 1545 nm in a single-clad, Er-doped fiber having a core area of 875 μm²; the core was pumped by a high brightness Raman laser at 1480 nm; and the pulses had a record peak power of several hundred kW.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

General Structure

Figure 1:
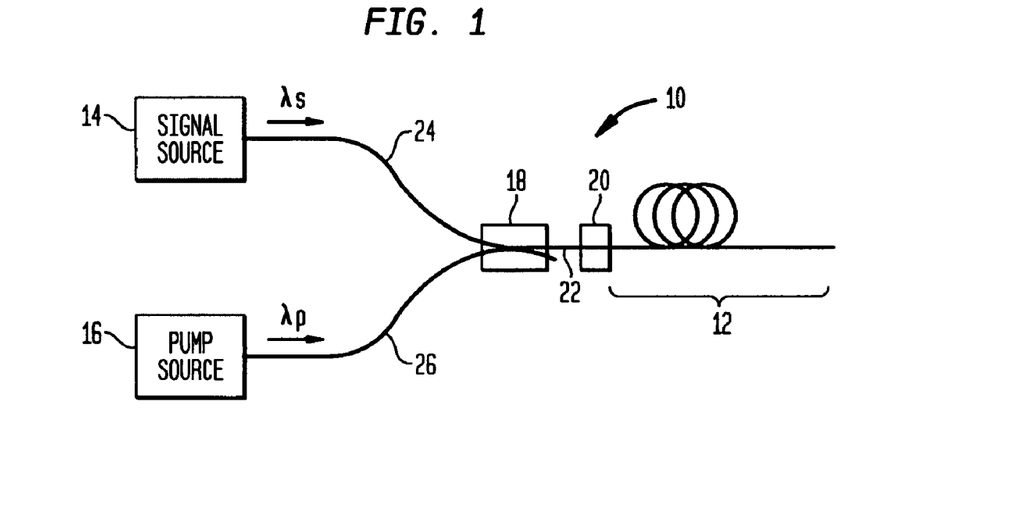
FIG. 1 is a schematic, block diagrammatic view of an optical amplifier in accordance with one embodiment of our invention.

Before discussing our invention in detail, we first turn to FIG. 1, which shows an optical amplifier (OA) 10 comprising a LMA, multimode, GPF 12 that amplifies signal light ($\lambda_s$) emanating from source 14 when pump light ($\lambda_p$) is concurrently absorbed in GPF 12. More specifically, signal light and pump light, which typically have different wavelengths, are transmitted over separate, typically standard input optical fibers 24 and 26, respectively, to a wavelength-division multiplexer (WDM) 18. WDM 18 multiplexes the signal and pump light onto a typically standard input fiber 22, which is coupled into the core of GPF 12. Input fibers 22, 24 and 26 may be small-core-area single mode fibers or they may be larger-core-area multimode fibers, but in either case the fibers are designed so that preferably the signal and pump light propagate in the same, single transverse mode (e.g., the fundamental mode). Alternatively, the pump light may also propagate in other modes; that is, it may be somewhat multimoded provided that its mode group includes at least the single mode of the signal light.

For typical high power applications, the signal light is generated in the form of short duration, high energy pulses. The peak power of such pulses is illustratively greater than a few tens of kilowatts and often greater than a few hundred kilowatts.

In accordance with one aspect of our invention, OA 10 has several important features, which have enabled our amplifier to generate signal light pulses having record peak power; that is, (i) the area of the core of GPF 12 exceeds approximately 350 μm² and preferably exceeds approximately 800 μm²; (ii) pump source 16 is a high brightness source of pump light; (iii) pump light is coupled directly into the core of GPF 12 (not into the cladding as in typical prior art DCF designs); and (iv) pump and signal light, which preferably propagate in the same, single transverse mode, are coupled into GPF 12 via a mode expander 20.

The brightness of a light beam source is defined as the power (P) per unit mode area at the beam focus per unit solid angle of divergence in the farfield. It is measured in units of $W/(sr\ cm^2)$. For more detail see, for example, "Encyclopedia of Laser Physics and Technology," which can be found on the internet at URL http://www.rp-photonics.com/brightness.html and is incorporated herein by reference. Brightness can be represented as power divided by the etendue, which is a function of the area of the source and the solid angle into which the light propagates. For simple systems, etendue can be approximated by $\pi \cdot S \cdot NA^2$, where S is the source area.

Consider a conventional low brightness laser diode array that delivers light to a GPF by means of a fiber pigtail with a core of diameter d and numerical aperture NA. Typical commercially available laser diode arrays deliver roughly 10 W of power into a pigtail core of 105 μm diameter and 0.22 NA (etendue of roughly $1.3 \times 10^3$ sr μm²), which means that the output beam has a brightness of about 7.6 mW/(sr μm²). By high brightness we mean that the brightness of our pump source is at least 30 times greater than that of a conventional low brightness laser diode array; preferably 100 times greater. Therefore, illustratively our high brightness pump source would deliver to GPF 12 at least 760 mW/(sr μm²).

In general, the function of mode expander 20 is to increase the size (MFA) of a mode without changing the order of the transverse mode. Consider, for example, a mode expander that couples a standard 8 μm core diameter input fiber 22 to a multimode, 45 μm core diameter GPF 12. Assume that fundamental mode signal light propagates in the input fiber 22 and that this mode has a MFA of 50 μm². Then, mode expander 20 might, for example, increase the MFA of the signal to 700 μm² in GPF 12 but would maintain the signal in the fundamental mode. Similar comments apply to pump light propagating through expander 20 of FIG. 2.

We note here that the core area $A_{core}$ of an optical fiber is simply the physical area of the cross-sectional shape of the core ($A_{core}=\pi D^2/4$ in the case of a circular core), whereas the effective area of an optical fiber mode (i.e., its MFA) is defined by $A_{mode}=\int|E|^2 dA)^2/\int|E|^4 dA$, where E is the local electric field and the integrations are understood to be performed over the cross sectional area of the core. This integral captures the area weighting of the optical intensity to correctly quantify the impact of nonlinear impairments. These two areas are often significantly different from one another. For example, at 1500 nm a 30 μm diameter circular core with $\Delta n=0.003$ contains a transverse mode with only a 24 μM modefield diameter. Such a mode fills only about 64% of the core area. Likewise, at 1500 nm a 45 μm core with $\Delta n=0.003$ contains a mode with only a 32 μm modefield diameter. Such a mode fills only about 53% of the core area.

In input fiber 22 the signal light and the pump light preferably propagate in the same, single transverse mode, preferably the fundamental mode. However, the core of LMA GPF 12 is significantly larger (e.g., >21 μm for a core area of >350 μm²) than that of fiber 22. Therefore, mode expander 20 couples the relatively smaller modefields of the signal and pump light in relatively smaller core input fiber 22 to larger modefields in the typically much larger core of GPF 12.

Figure 2:
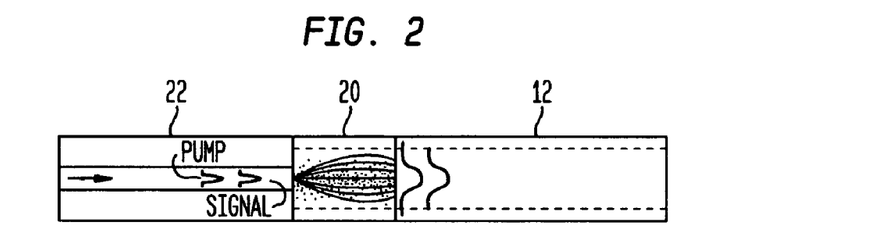
FIG. 2 is a schematic view of a mode expander for use in various embodiments of our invention.

As shown in greater detail in FIG. 2, mode expander 20 illustratively comprises a fiber-based GRIN lens axially aligned with input fiber 22 and LMA GPF 12. The GRIN lens has parabolic index profile which causes light to defocus and focus with a fixed axial pitch. The cross-sectional (radial) spot size of the light varies along the length. If the GRIN lens length is a multiple of this pitch, the output spot size (area) is the same as the input spot size. However, if the length is half of the pitch, then the beam exits with a much larger spot size, which may be similar to the diameter of the GRIN lens itself. Well known design techniques are used to make the spot size essentially the same as the core area of GPF 12.

Much to our surprise we have found that mode expanders such as silica-fiber-based GRIN lenses are essentially wavelength independent over the range of about 1000-1600 nm. For example, consider a silica GRIN lens designed to couple light from a standard single-mode fiber to a multimode, step-index ($\Delta n=0.01$), single-clad, Er-doped, LMA fiber at 1550 nm. With an optimized parabolic refractive index profile in the GRIN lens, we calculated mode coupling between 800 nm and 1700 nm. Over the range 1000-1600 nm we found that the coupling loss of the $LP_{01}$ mode was only about 0.12-0.20 dB. In addition, we found that most of the energy lost from the $LP_{01}$ mode is launched into higher order modes (e.g., $LP_{02}$ and $LP_{03}$). These calculations indicate that a relatively wide separation between the signal and pump light wavelengths is tolerable.

The fabrication of fiber-based GRIN lenses is described by D. J. DiGiovanni et al. in U.S. Pat. No. 7,013,678, which issued on Mar. 21, 2006 and is incorporated herein by reference.

An alternative mode expander 20 is a simple diffused fiber splice created using a long duration of heating in a well-known splicer. The core of input fiber 22 can be diffused prior to splicing to increase its mode area to match that of GPF fiber 12.

Another alternative mode expander 20 comprises a segment of multimode fiber in which the cross-sectional area of the core is tapered along the longitudinal axis of the segment (e.g., if the segment has a circular cross-section, the core diameter is tapered). At one end of such a tapered segment the mode field should match that of GPF12 to provide relatively low-loss coupling of the signal into GPF12. At the opposite end the segment should match the mode field of input fiber 22. Tapering by stretching, for example, reduces the radial dimension of the core so that it guides the signal mode with relatively low loss coupling from input fiber 22. Such a tapered segment would also transmit the pump light with relatively low coupling loss. The tapered segment of multimode fiber may be formed from a piece of standard fiber or from a section of GPF 12.

In an alternative embodiment of our invention, multiple pump sources are used to pump multimode, LMA GPF 12. These sources may be frequency/wavelength multiplexed or spatially multiplexed into GPF 12. Thus, as shown in OA 10' of FIG. 3, pump sources 16.1 and 16.2 are coupled to WDM 18 via typically standard input fibers 26.1 and 26.2, respectively, whereas signal source 14 is coupled to WDM 18 via typically standard input fiber 24. As before, WDM 18 multiplexes the signal light and pump light onto a typically standard input fiber 22, which is coupled into the core of GPF 12. Moreover, as in FIG. 1, signal input fiber 24 and pump input fibers 26.1 and 26.2 may be either single mode or multimode fibers. A mode expander 20 is interposed between WDM 18 and GPF 12.

Figure 3:
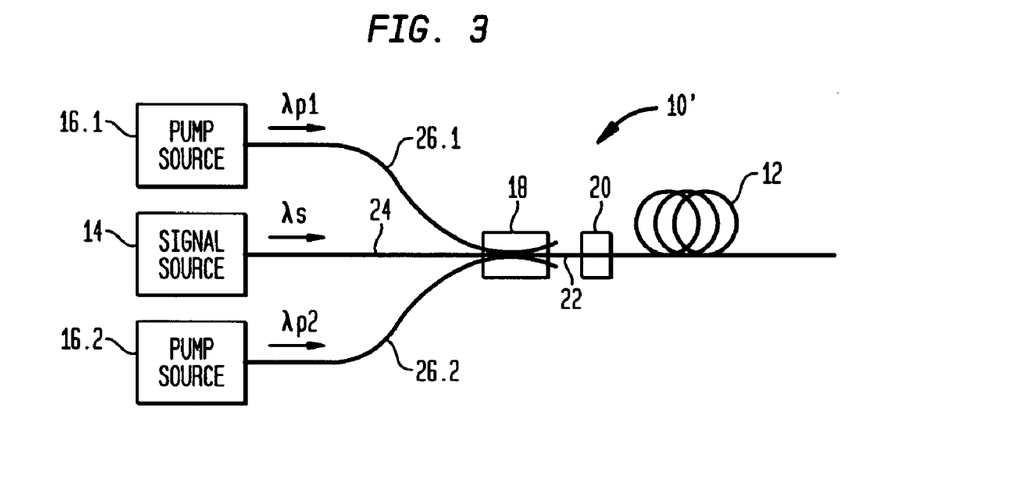
FIG. 3 is a schematic, block diagrammatic view of an optical amplifier, including multiple pump sources, in accordance with another embodiment of our invention.

In this embodiment, the pump sources may have essentially the same wavelength ($\lambda_{p1}=\lambda_{p2}$; e.g., at 1480 nm), or they may have different wavelengths ($\lambda_{p1} \neq \lambda_{p2}$; e.g., at 1480 nm and 1485 nm), provided the wavelengths are within the absorption spectrum of GPF 12. In either case, separate WDMs (not shown) could be utilized to couple each pump source into the core of GPF 12 or a multiport WDM, such as a thin-film filter array or an arrayed waveguide grating (AWG), could be used. In addition, if the WDM 18 is used with single mode pump light, then the multiple pump sources should have different wavelengths to avoid interference effects in WDM 18.

Figure 4:
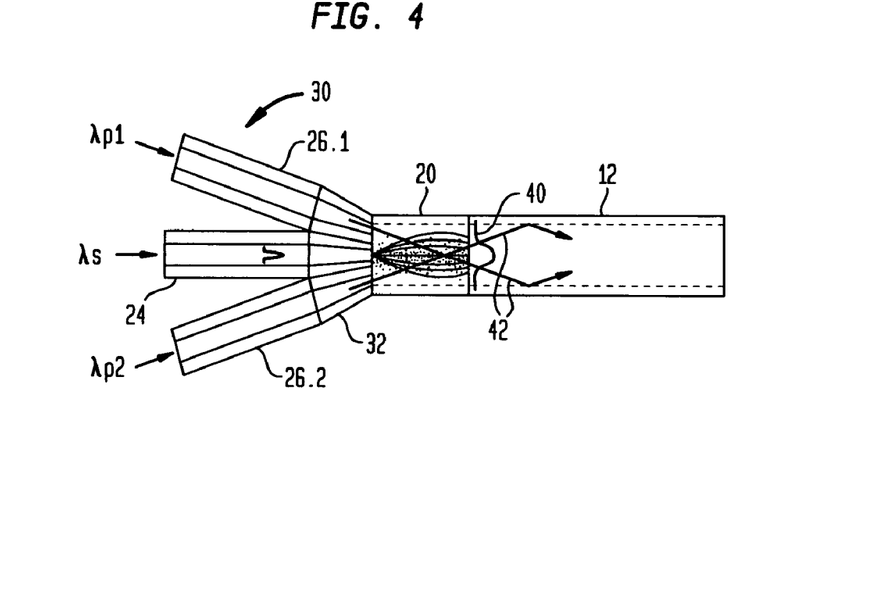
FIG. 4 is a schematic view of a pump coupling arrangement and mode expander for use, for example, in the embodiment of FIG. 3.

On the other hand, in order to spatially couple multiple pumps into the core of GPF 12, we prefer a coupling arrangement of the type shown in FIG. 4. Here, a tapered fiber bundle 30 is coupled to a GRIN lens mode expander 20, which in turn is coupled to GPF 12. In bundle 30 pump light is carried by outer input fibers 26.1 and 26.2, whereas signal light is carried by a central input fiber 24. All three fibers are tapered in region 32 to a reduced, closely packed, fused cross section that is used to couple light into the GRIN lens 20 (i.e., into the core of GPF 12). However, in this embodiment expander 20 increases the MFA of only the single mode (e.g., fundamental mode) signal light. The pump light, which is coupled at various angles into the core of GPF 12, excites higher order modes, which effectively fill the core. Therefore, expander 20 need not be designed to increase the size of such higher order modes.

The outer diameters, and in some cases the cores, of fibers 26.1, 26.2 and 24 are tapered. Tapering can be accomplished by physically stretching the heated bundle, or by etching the fibers prior to fusing into a bundle without stretching.

We chose to illustrate the use of two pump sources for simplicity only. Those skilled in the art will appreciate that more than two can readily be employed, with the actual number depending only on practical constraints in tapering more fibers to a cross-section sufficiently small to enable pump and signal light to be effectively coupled into GRIN lens 20.

Bundle 30 is similar to that described by D. J. DiGiovanni et al. in U.S. Pat. No. 5,864,644, which issued on Jan. 26, 1999 and is incorporated herein by reference. However, our fiber bundle 30 differs principally in that pump light is coupled into the core of single-clad GPF 12 rather than into the cladding of a double-clad GPF.

Since the core area of GPF 12 is relatively large, it can support many transverse modes and it can guide high brightness pump light. Thus, pump light is captured by the core in higher-order transverse modes 42 (FIG. 4), whereas the signal typically propagates in another mode (e.g., the fundamental mode depicted by Gaussian profile 40). Since the pump light excites higher-order modes in GPF 12, pump fibers 26.1 and 26.2 may also be multimode and deliver multimode pump light, as noted above. However, the brightness of the pump light (i.e., should still be suitably high to be efficiently captured by the core of GPF 12 (i.e., in a high brightness pump source the light rays make relatively shallow angles to the fiber axis and hence are more easily captured). Importantly, the use of multiple pumps increases the amount of pump light coupled in the core of GPF 12 and hence increases the gain available to the signal light. However, since the large core of GPF 12 is filled with pump light, the overlap between the transverse (radial) profile of the signal light and the pump light is less than perfect since the signal mode typically fills only a fraction of a LMA core. In this configuration, the use of multiple pump sources produces gain at the expense of slightly impaired pump-signal overlap. However, this impairment can be partially remedied by restricting the gain dopant to the region of the core where the signal mode resides. In such a design, pump light is absorbed only in regions where appreciable signal is present.

Note that the condition of dissimilar pump and signal wavelengths results in excitation of multiple pump modes after the mode expander 20 of FIG. 4.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, although we have described the pumping arrangements of FIGS. 1-5 as utilizing co-propagating pumps, it is well known to those skilled in the art that counter-propagating pump arrangements, although not preferred, could also be utilized.

Moreover, multiple OA stages may be arranged in tandem with one another. To enhance amplification efficiency each stage may include progressively larger core area GPFs, with the smallest core area GPF stage being first (i.e., nearest to the signal source) and with the largest core area GPF stage being last (i.e., farthest from the signal source).

In addition, the OAs described above can be utilized to provide the requisite gain for a laser by locating GPF 12 in an optical resonator; e.g., by forming suitable fiber gratings or other reflectors (not shown) in standard fibers at the input and output ends of GPF 12. In the case of a laser, of course, a separate signal source 14 need not be utilized; that is, the signal would be internally generated by GPF 12, which serves as the active medium of the laser.

Throughout this discussion references made to wavelength are intended to mean the center wavelength of a particular light emission, it being understood that all such emissions have a characteristic linewidth that includes a well-known range of wavelengths above and below the center wavelength. In addition references made to light propagation in a single transverse mode are intended to include propagation in essentially a single mode; that is, in a practical sense perfect suppression of all other modes may not always be possible. However, single mode does imply that the intensity of such other modes is either small or insignificant.

In some embodiments, we have referred to GPF 12 as being single-clad. In the illustrations described these single-clad fibers indeed comprised a core surrounded by a single optical cladding (e.g., a single silica cladding). However, in general we do not intend the phrase single-clad to exclude more complex claddings, such as those having multiple features (e.g., index rings, trenches or air holes). Moreover, an important aspect of a single-clad GPF, as used herein, is that pump light is guided in the core, not the cladding.

Figure 5:
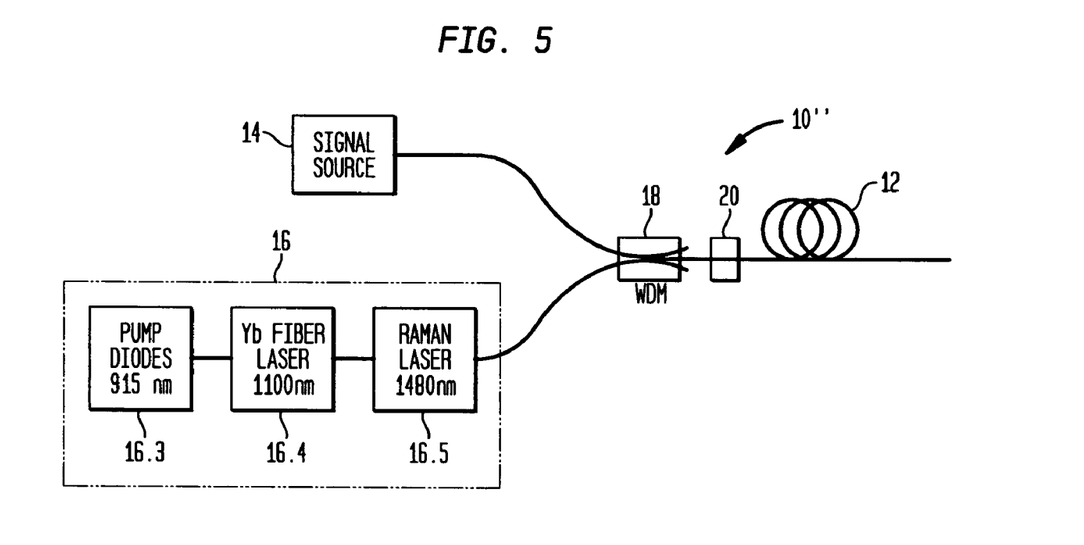
FIG. 5 is a schematic, block diagrammatic view of an optical amplifier employing an Er-doped fiber pumped by a high brightness 1480 nm pump source.

Finally, for high power applications at eye-safe signal wavelengths we prefer an OA 10'' of the type shown in FIG. 5. Here, GPF 12 is an Er-doped fiber having a relatively large core area (e.g., >800 $\mu m^2$). Signal source 14 generates short (e.g., nanosecond) duration optical pulses at a wavelength above 1500 nm (e.g., at 1545 nm). On the other hand, pump source 16 comprises a low brightness first source illustratively depicted as an array 16.3 of semiconductor laser diodes (LDs) that generate pump light at about 900-1000 nm (e.g., 915 nm). The brightness of the array is increased (e.g., by a factor of 200) by using the LDs to pump a second source, a Yb-doped, cladding pumped fiber laser 16.4. The output of laser 16.4 (e.g., at 1100-1200 nm) is shifted to 1480-1490 nm by means of a cascaded Raman resonator laser 16.5. The Raman laser is described by C. Headley in "Raman Amplification in Fiber Optical Communication Systems," Elsevier Academic Press, Ch. 7 *Cascaded Raman Resonators*, pp. 303-374 (2006), which is incorporated herein by reference. The 1480-1490 nm output of Raman laser 16.5 provides high brightness pump light to GPF 12 via WDM 18 and mode expander 20 in the manner described above.

Of course, other gain-producing species may be used to implement optical amplification schemes, including other rare-earth elements (e.g., Nd, Tm, Ho, etc) or chromium (Cr). For example, LDs at 800 nm can be used to pump a Nd-doped fiber laser to produce a high brightness output at 1060 nm, which in turn pumps a Yb-doped fiber amplifier to provide gain to a 1080 nm signal.

EXAMPLE

This example describes amplification of nanosecond pulses in a single-clad, multimode, LMA Er-doped fiber. Various materials, dimensions and operating conditions are provided by way of illustration only and, unless otherwise expressly stated, are not intended to limit the scope of the invention. The area of the Er-doped core was a record 875 $\mu m^2$. The core was pumped at 1480 nm with a Raman fiber laser. The large energy storage capacity and low nonlinearity of the Er-doped fiber enabled an all-fiber system generating record energy per pulse and record peak power in a single transverse mode with an $M^2<1.1$.

Although the Er-doped LMA fiber was a multimode fiber, the signal and pump light propagated in this fiber in a single (fundamental) mode.

All-fiber means components are fusion-splice together, without free-space coupling into the fibers. Laser diodes and other components having fiber pigtails may use free space coupling, but inside well-controlled packages.

Figure 6:
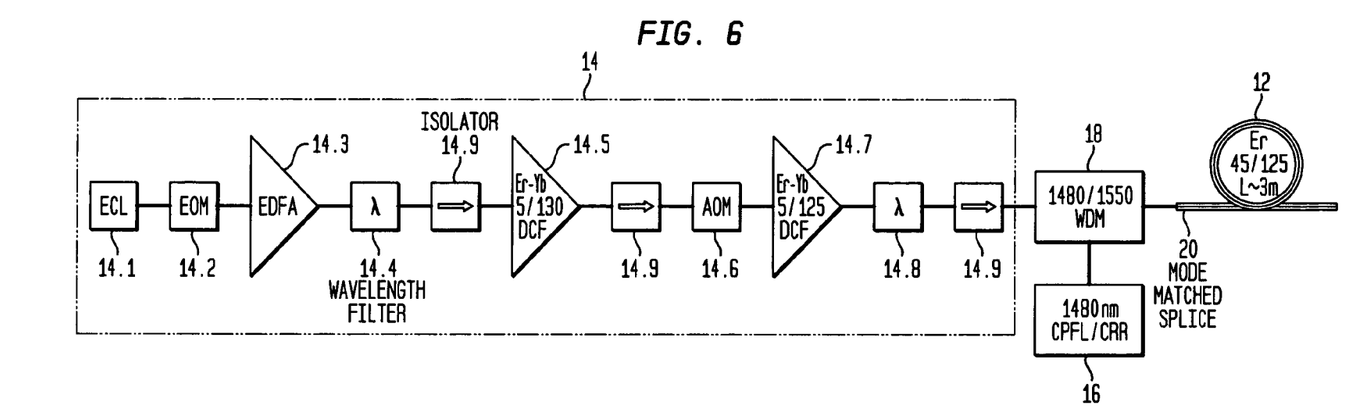
FIG. 6 is a schematic, block diagrammatic view of the optical amplifier of FIG. 5 showing the signal source in more detail.

FIG. 6 is a schematic of our amplifier chain. The signal source 14 comprised a wavelength tunable external cavity cw laser 14.1 (ECL; center wavelength set to $\lambda_s$=1545 nm) modulated with a high extinction electro-optic modulator 14.2 (EOM; available commercially from Photline Technologies, Pittstown, N.J.) followed by several preamplifier and filtering stages. The pulse duration and wavelength were controlled precisely. A 500 kHz pulse train was amplified in a standard single mode, Er-doped fiber preamplifier 14.3 (EDFA). The pulse train was spectrally filtered (to eliminate most of the ASE) by filter 14.4 and amplified in an Er—Yb fiber preamplifier 14.5 (double clad 5/130 μm core/clad diameter). The pulse train was then sent through an acousto-optic modulator 14.6 (AOM; 100 ns rise time) to step down the repetition rate to the desired value for the final output.

The initial high repetition rate resulted in most of the population inversion being depleted by stimulated (as opposed to spontaneous) emission, resulting in low inter-pulse ASE. Stepping down the repetition rate with the AOM further eliminated the accumulated inter-pulse ASE. The pulses were then amplified in a single mode, double clad Er—Yb fiber preamplifier 14.7 (12/125 μm core/clad diameter). The output was spectrally filtered with a 1 nm wide bandpass filter 14.8. The spectral signal-to-background ratio was >45 dB. This output was then coupled into the final power amplifier stage via a 1480/1550 nm fused fiber coupler, which served as WDM 18. The pulse peak power at this point was limited to ~300 W by the nonlinearity induced in components made of small area standard single mode fiber that followed the gain fiber.

Isolators 14.9 were disposed between filter 14.4 and amplifier 14.5, between amplifier 14.5 and AOM 14.6, and between filter 14.8 and WDM 18.

Figure 7:
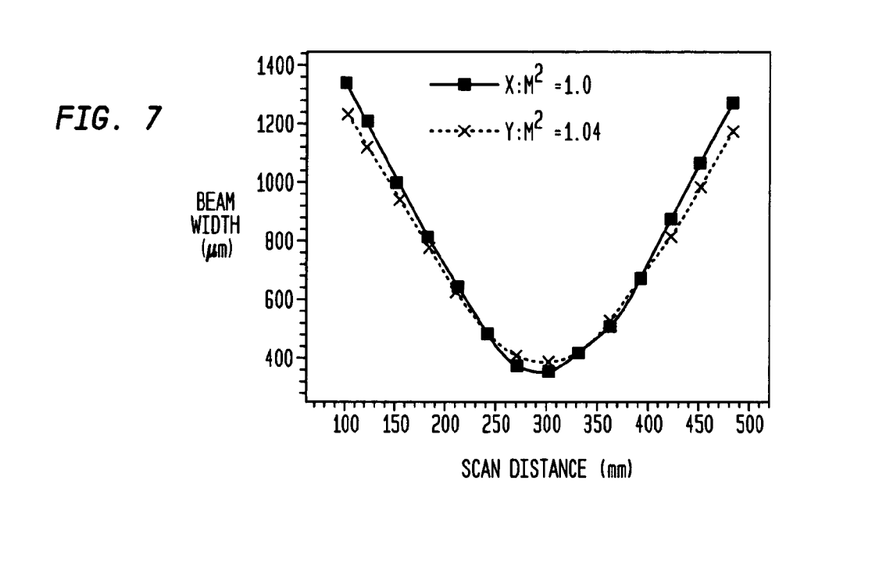
FIG. 7 shows $M^2 < 1.1$ measured at low power and high pulse repetition rates. Light exiting the gain-producing fiber was focused by a lens onto a photodetector. The distance from the lens to the detector was increased, and the width of the optical beam was measured. The minimum beam width and the variation of beam width with axial distance along the beam (the scan distance) were used to calculate $M^2$ of the beam since the behavior of a perfect Gaussian beam is known. Since the beam was typically slightly noncircular, the measurement was made in two orthogonal orientations indicated as x and y.

Our power amplifier stage comprised a 3-m-long, single-clad, large-mode-area Er-doped, multimode, silica fiber 12 having a 45/125 μm core/clad diameter. It had a step index profile with an area of ~875 μm$^2$. The pump absorption per unit length was 20 dB/m at a signal wavelength of 1535 nm. A silica-fiber-based, GRIN lens, mode expander 20 matched the 1480/1550 nm coupler (WDM) mode to the fundamental mode of the Er-doped fiber 12. Spectral measurements of multi-path interference showed that only ~1% of the optical energy was coupled into a higher order mode. The Er-doped fiber coil diameter exceeded 30 cm to minimize detrimental effects of bend-induced mode mixing and reduction in area. [See, J. M. Fini, "Bend-Resistant Design of Conventional and Microstructure Fibers with Very Large Mode Area," *Optics Express*, Vol. 14, No. 1, pp. 69-81 (2006), which is incorporated herein by reference.] M$^2$<1.1 was measured at high repetition rate and low amplification levels, which confirmed the clean single mode excitation of the amplifier (FIG. 7). Handling the fiber did not pose any serious challenge—the output beam profile of an undisturbed fiber remained uniform and steady at all power levels.

The pump for the power amplifier stage comprised an arrangement of the type shown as pump source 16 of FIG. 5; that is, pump source 16 comprised a cladding pumped, Yb-doped fiber laser 16.4 (CPFL; pumped by an array 16.3 of low brightness 915 nm diodes) whose wavelength was shifted from ~1100 nm to 1480 nm by means of a cascaded Raman resonator (CRR) laser 16.5. With 28 W of 915 nm pump power, we were able to generate ~9 W of high brightness light in a single mode fiber at 1480 nm. A tilted grating (not shown) at the output of the CRR was used to filter the next Stokes order centered at ~1585 nm.

The Er amplifier performance was characterized as a function of the pulse repetition frequency $F_R$ at input pulse durations $\tau_p$ of 1 ns and 5 ns. The input pulse peak power was maintained between 250 W and 300 W at all repetition rates.

The amplifier output pulse energy was calculated from the pulse width recorded with a 20 GHz sampling oscilloscope. A correlation between the trace area and pulse energy had been established at high repetition rates. We observed that the pulse energy increased linearly as a function of pump power absorbed by the fiber at various repetition rates, demonstrating that the amplifier remained unsaturated at the maximum pulse energy. We also made measurements of the pulse energy, average power, pulse peak power, and efficiency as a function of the repetition rate. These measurements enabled us to demonstrate the efficacy of our core pumped scheme with an Er-doped fiber of record mode area for amplification of nanosecond pulses at the eye-safe wavelength of 1545 nm. Record pulse energy (a few 100 s of μJ), peak power (a few 100 s of kW), and average power (many 100 s of mW) were achieved under single mode operation with an M$^2$<1.1 in an all-fiber scheme. However, we expect even better results using the multiple pump source design of FIGS. 3-4.

We claim:

1. High power optical fiber apparatus comprising:
   an input fiber having a first core region configured to propagate signal light in a single transverse mode and pump light in at least the same, single transverse mode,
   a high brightness source of said pump light,
   a multimode, gain-producing optical fiber having a second core region and a cladding region surrounding said second core region, the cross-sectional area of said second core region exceeding approximately 350 μm$^2$ and exceeding the cross-sectional area of said first core region, said second core region configured to provide gain to said signal light propagating therein when said pump light is absorbed therein, and
   a mode expander for coupling said signal light and said pump light from said first core region into said second core region and for altering the mode field areas of said signal light and said pump light in said input fiber to match the corresponding mode field areas in said second core region.

2. The apparatus of claim 1, wherein said mode expander comprises a fiber-based GRIN lens.

3. The apparatus of claim 1, wherein said signal light has a wavelength in the range of approximately 1500-1600 nm and said pump light has a wavelength of approximately 1480-1490 nm.

4. The apparatus of claim 3, wherein said gain-producing fiber is doped with Er.

5. The apparatus of claim 1, wherein said pump source comprises
   an array of LDs for generating low brightness first pump light, and
   a fiber laser pumped by said first pump light, the output of said fiber laser configured to pump said gain-producing fiber.

6. The apparatus of claim 5, wherein said fiber laser comprises
   a first fiber laser responsive to said low brightness pump light for generating higher brightness second pump light, and
   a Raman fiber laser responsive to said higher brightness second pump light for up-shifting the wavelength of said higher brightness pump light, said up-shifted pump light being supplied to said gain-producing fiber to amplify said signal light.

7. The apparatus of claim 6, wherein said array of LDs is configured to generate said low brightness first pump light at a wavelength of approximately 900-1000 nm, said first fiber laser comprises a Yb-doped fiber laser configured to generate said higher brightness second pump light, and said Raman laser is responsive to said second pump light for shifting the wavelength to amplify said signal light.

8. The apparatus of claim 7, wherein said Yb-doped laser comprises a cladding pumped fiber laser and said Raman laser comprises a cascaded Raman resonator laser.

9. The apparatus of claim 1, wherein said second core region area exceeds approximately 800 $\mu m^2$.

10. The apparatus of claim 1, wherein said high brightness source of pump light comprises a multiplicity of sources of pump light each having a different wavelength, said pump light and said signal light being multiplexed onto said input fiber.

11. The apparatus of claim 1, wherein said apparatus comprises an optical amplifier.

12. The apparatus of claim 1, wherein said apparatus comprises a laser.

13. The apparatus of claim 1, wherein said gain-producing fiber comprises a single-clad fiber.

14. The apparatus of claim 1, wherein said input fiber is configured so that said pump light propagates therein in only the same, single transverse mode as said signal light.

15. The apparatus of claim 1, wherein said mode expander comprises a fiber-segment in which the cross-sectional area of its core region is tapered along the longitudinal axis of said segment, said segment having a relatively larger area adjacent said second core region and a relatively smaller area adjacent said first core region.

16. High power optical fiber amplifier comprising:
an input fiber having a first core region configured to propagate signal light and pump light in a fundamental transverse mode,
a high brightness source of said pump light comprising an array of LDs for generating low brightness first pump light, a first fiber laser responsive to said low brightness pump light for generating higher brightness second pump light, and a Raman fiber laser responsive to said higher brightness second pump light for up-shifting the wavelength of said higher brightness pump light, said up-shifted pump light being supplied to said gain-producing fiber to amplify said signal light,
a multimode, gain-producing Er-doped, single-clad, optical fiber having a second core region and a cladding region surrounding said core region, the cross-sectional area of said second core region exceeding approximately 800 $\mu m^2$ and exceeding the cross-sectional area of said first core region, said second core region configured to provide gain to said signal light propagating therein when said pump light is absorbed therein, and
a fiber-based, GRIN lens mode expander for coupling said signal light and said pump light from said first core region into said second core region and for altering the mode field areas of said signal light and said pump light in said input fiber to match the corresponding mode field areas in said second core region,
wherein said signal light has a wavelength in the range of approximately 1500-1600 nm and said pump light has a wavelength of approximately 1480-1490 nm.

17. High power optical fiber apparatus comprising:
an input fiber comprising a first core region configured to propagate signal light in a single transverse mode,
a multimode, gain-producing optical fiber having a second core region and a cladding region surrounding said core region, the cross-sectional area of said core region exceeding approximately 350 $\mu m^2$ and exceeding the cross-sectional area of said first core region, said second core region configured to provide gain to said signal light propagating therein when pump light is absorbed therein, and
multiple high brightness sources of said pump light coupled into only said second core region,
said gain-producing fiber configured to propagate, within said second core region, said signal light in a single transverse mode and said pump light in different transverse modes.

18. The apparatus of claim 17, wherein said pump sources generate pump light at essentially the same wavelength.

19. The apparatus of claim 17, wherein said pump sources generate pump light at different wavelengths.

20. The apparatus of claim 18, wherein said signal light has a wavelength in the range of approximately 1500-1600 nm and said pump light has a wavelength of approximately 1480-1490 nm.

21. The apparatus of claim 17, wherein said signal light propagates in a fundamental transverse mode and said pump light propagates in multiple higher order modes within said core region.

22. The apparatus of claim 17, further including a mode expander for coupling said signal light directly into said second core region.

23. The apparatus of claim 18, further including a coupler for optically coupling said signal and pump light into said mode expander, said coupler comprising a central fiber segment for carrying said signal light, a multiplicity of peripheral fiber segments for carrying said pump light, said segments being tapered to a reduced cross-sectional area in a region coupled to said mode expander.

24. The apparatus of claim 17, wherein said second core area exceeds approximately 800 $\mu m^2$.

25. The apparatus of claim 17, wherein said gain-producing fiber comprises a single-clad fiber.

26. The apparatus of claim 17, wherein said apparatus comprises an optical amplifier.

27. The apparatus of claim 17, wherein said apparatus comprises a laser.

* * * * *